(12) United States Patent
Liang et al.

(10) Patent No.: US 11,671,024 B2
(45) Date of Patent: *Jun. 6, 2023

(54) REGULATED SWITCHED MODE POWER SUPPLIES HAVING ADJUSTABLE OUTPUT VOLTAGES

(71) Applicant: Astec International Limited, Kowloon (HK)

(72) Inventors: Lian Liang, Shenzhen (CN); Bing Zhang, Shenzheng (CN); Mei Qin, Shenzhen (CN); Wenyong Liu, Shenzhen (CN); Zhishuo Li, Shenzhen (CN)

(73) Assignee: Astec International Limited, Kowloon (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,217

(22) Filed: Jan. 6, 2022

(65) Prior Publication Data
US 2022/0131473 A1 Apr. 28, 2022

Related U.S. Application Data

(63) Continuation of application No. 16/745,700, filed on Jan. 17, 2020, now Pat. No. 11,223,289.

(51) Int. Cl.
*H02M 3/335* (2006.01)
*H02M 1/08* (2006.01)
*H02M 1/00* (2006.01)

(52) U.S. Cl.
CPC ......... *H02M 3/33576* (2013.01); *H02M 1/08* (2013.01); *H02M 1/0025* (2021.05)

(58) Field of Classification Search
CPC ... H02M 3/33576; H02M 1/08; H02M 1/0025
See application file for complete search history.

(56) References Cited

U.S. PATENT DOCUMENTS

| | | | |
|---|---|---|---|
| 6,509,282 B1 | 1/2003 | Ngo et al. | |
| 7,072,190 B2 | 7/2006 | Schlecht | |
| (Continued) | | | |

FOREIGN PATENT DOCUMENTS

| | | |
|---|---|---|
| CN | 104335469 A | 2/2015 |
| CN | 104919689 A | 9/2015 |
| | (Continued) | |

OTHER PUBLICATIONS

First Office Action for China Application No. 202010709832.6, dated Mar. 14, 2022; 14 pages.

(Continued)

*Primary Examiner* — Kyle J Moody

(57) ABSTRACT

A switched mode power supply includes a power circuit and a control circuit coupled to the power circuit for regulating its output voltage. The control circuit is configured to generate a control signal for at least one power switch of the power circuit using a reference voltage, determine if a duty cycle of the control signal is within a defined range, sense one or more output parameters of the power circuit including the output voltage of the power circuit, and in response to determining the duty cycle of the control signal is outside the defined range, adjust the reference voltage to adjust the duty cycle of the control signal. The reference voltage is adjustable over time to thereby linearly adjust the output voltage of the power circuit. Other example switched mode power supplies, control circuits, and methods for regulating output voltages of switched mode power supplies are also disclosed.

20 Claims, 7 Drawing Sheets

(56) References Cited

U.S. PATENT DOCUMENTS

| | | |
|---|---|---|
| 7,091,874 B2 | 8/2006 | Smithson |
| 7,218,086 B1 | 5/2007 | Ritter et al. |
| 7,269,034 B2 | 9/2007 | Schlecht |
| 7,272,021 B2 | 9/2007 | Schlecht et al. |
| 7,453,709 B2 | 11/2008 | Park et al. |
| 7,502,236 B2 | 3/2009 | Baeurle et al. |
| 7,558,083 B2 | 7/2009 | Schlecht |
| 7,564,702 B2 | 7/2009 | Schlecht |
| 7,787,261 B2 | 8/2010 | Farrington et al. |
| 8,004,263 B2 | 8/2011 | Hirata et al. |
| 8,149,597 B2 | 4/2012 | Farrington et al. |
| 8,193,790 B2 | 6/2012 | Asuncion et al. |
| 8,493,751 B2 | 7/2013 | Schlecht |
| 8,787,040 B2 | 7/2014 | Huang et al. |
| 8,791,676 B2 | 7/2014 | Liu |
| 9,698,694 B2 | 7/2017 | Xiang et al. |
| 10,153,701 B2 | 12/2018 | Karlsson et al. |
| 11,223,289 B2 * | 1/2022 | Liang .................... H02M 1/08 |
| 2004/0207532 A1 | 10/2004 | Smithson |
| 2010/0289467 A1 | 11/2010 | Wu et al. |
| 2011/0026275 A1 | 2/2011 | Huang et al. |
| 2011/0187396 A1 | 8/2011 | Jarrige et al. |
| 2011/0199796 A1 | 8/2011 | Wu et al. |
| 2012/0229034 A1 | 9/2012 | Yu et al. |
| 2013/0076248 A1 | 3/2013 | Shimizu et al. |
| 2013/0202061 A1 | 8/2013 | Chandrasekaran |
| 2013/0343094 A1 | 12/2013 | Karlsson et al. |
| 2014/0015330 A1 | 1/2014 | Byun et al. |
| 2014/0191736 A1 | 7/2014 | Babazadeh et al. |
| 2015/0055375 A1 | 2/2015 | Karlsson et al. |
| 2015/0078041 A1 | 3/2015 | Huang |
| 2015/0115717 A1 | 4/2015 | Horng et al. |
| 2015/0303803 A1 | 10/2015 | Chen et al. |
| 2020/0395862 A1 | 12/2020 | Hara |

FOREIGN PATENT DOCUMENTS

| | | |
|---|---|---|
| CN | 105103426 A | 11/2015 |
| WO | 2009059527 A1 | 5/2009 |
| WO | 2012116750 A1 | 9/2012 |
| WO | 2013113354 A1 | 8/2013 |
| WO | 2013156079 A1 | 10/2013 |
| WO | 2015103766 A1 | 7/2015 |

OTHER PUBLICATIONS

"Intelligent Energy Management for Improved Efficiency," Ericsson, Jun. 2010, oas. 1-12.

* cited by examiner

REGULATED SWITCHED MODE POWER SUPPLIES HAVING ADJUSTABLE OUTPUT VOLTAGES

CROSS-REFERENCE TO RELATED APPLICATIONS

This application claims the benefit of and priority to U.S. application Ser. No. 16/745,700 filed Jan. 17, 2020, and issued on Jan. 11, 2022, as U.S. Pat. No. 11,223,289. The entire disclosure of the above application is incorporated herein by reference.

FIELD

The present disclosure relates to regulated switched mode power supplies having adjustable output voltages.

BACKGROUND

This section provides background information related to the present disclosure which is not necessarily prior art.

Switched mode power supplies commonly include power switches and one or more pulse width modulated (PWM) control signals for controlling the power switches. The output voltage of such power supplies may be regulated by generating a reference voltage based on sensed input and output parameters, comparing output voltage feedback information with the reference voltage, and adjusting a duty cycle of the power switches based on this comparison. Sometimes, the generated reference voltage causes the regulated output voltage to adjust in a stair-step manner.

SUMMARY

This section provides a general summary of the disclosure and is not a comprehensive disclosure of its full scope or all of its features.

According to one aspect of the present disclosure, a switched mode power supply (SMPS) includes a power circuit and a control circuit. The power circuit includes an input for receiving a variable input voltage, at least one power switch, and an output for providing an output voltage. The control circuit is coupled to the power circuit for regulating the output voltage of the power circuit. The control circuit is configured to generate a control signal for the at least one power switch using a reference voltage, determine if a duty cycle of the control signal is within a defined range, sense one or more output parameters of the power circuit including the output voltage of the power circuit, and in response to determining the duty cycle of the control signal is outside the defined range, adjust the reference voltage based on the one or more sensed output parameters of the power circuit and the duty cycle of the control signal, but not a sensed input parameter of the power circuit. The reference voltage is adjustable over time to thereby linearly adjust the output voltage of the power circuit.

According to another aspect of the present disclosure, a SMPS includes a power circuit and a control circuit. The power circuit includes an input for receiving a variable input voltage, at least one power switch, and an output for providing an output voltage. The control circuit is coupled to the power circuit for regulating the output voltage of the power circuit. The control circuit is configured to generate a control signal for the at least one power switch using a reference voltage, determine if a duty cycle of the control signal is within a defined range, sense the output voltage of the power circuit, and in response to determining the duty cycle of the control signal is outside the defined range, determine a comparison voltage based on the sensed output voltage of the power circuit and the duty cycle of the control signal, and adjust the reference voltage to equal the lessor of the comparison voltage and a maximum output voltage threshold of the power circuit. The reference voltage is adjustable over time to thereby linearly adjust the output voltage of the power circuit.

According to another aspect of the present disclosure, a control circuit is employable for regulating an output voltage of a SMPS having a variable input voltage and at least one power switch. The control circuit is configured to generate a control signal for the at least one power switch using a reference voltage, determine if a duty cycle of the control signal is within a defined range, sense one or more output parameters of the SMPS including the output voltage, and in response to determining the duty cycle of the control signal is outside the defined range, adjust the reference voltage based on the one or more sensed output parameters of the SMPS and the duty cycle of the control signal, but not a sensed input parameter of the SMPS. The reference voltage is adjustable over time to thereby linearly adjust the output voltage of the SMPS.

According to another aspect of the present disclosure, a control circuit is employable for regulating an output voltage of a SMPS having a variable input voltage and at least one power switch. The control circuit is configured to generate a control signal for the at least one power switch using a reference voltage, determine if a duty cycle of the control signal is within a defined range, sense an output voltage of the SMPS, and in response to determining the duty cycle of the control signal is outside the defined range, determine a comparison voltage based on the sensed output voltage of the SMPS and the duty cycle of the control signal, and adjust the reference voltage to equal the lessor of the comparison voltage and a maximum output voltage threshold. The reference voltage is adjustable over time to thereby linearly adjust the output voltage.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding (but not necessarily identical) parts and/or features throughout the several views of the drawings.

DETAILED DESCRIPTION

Figures 1, 2:
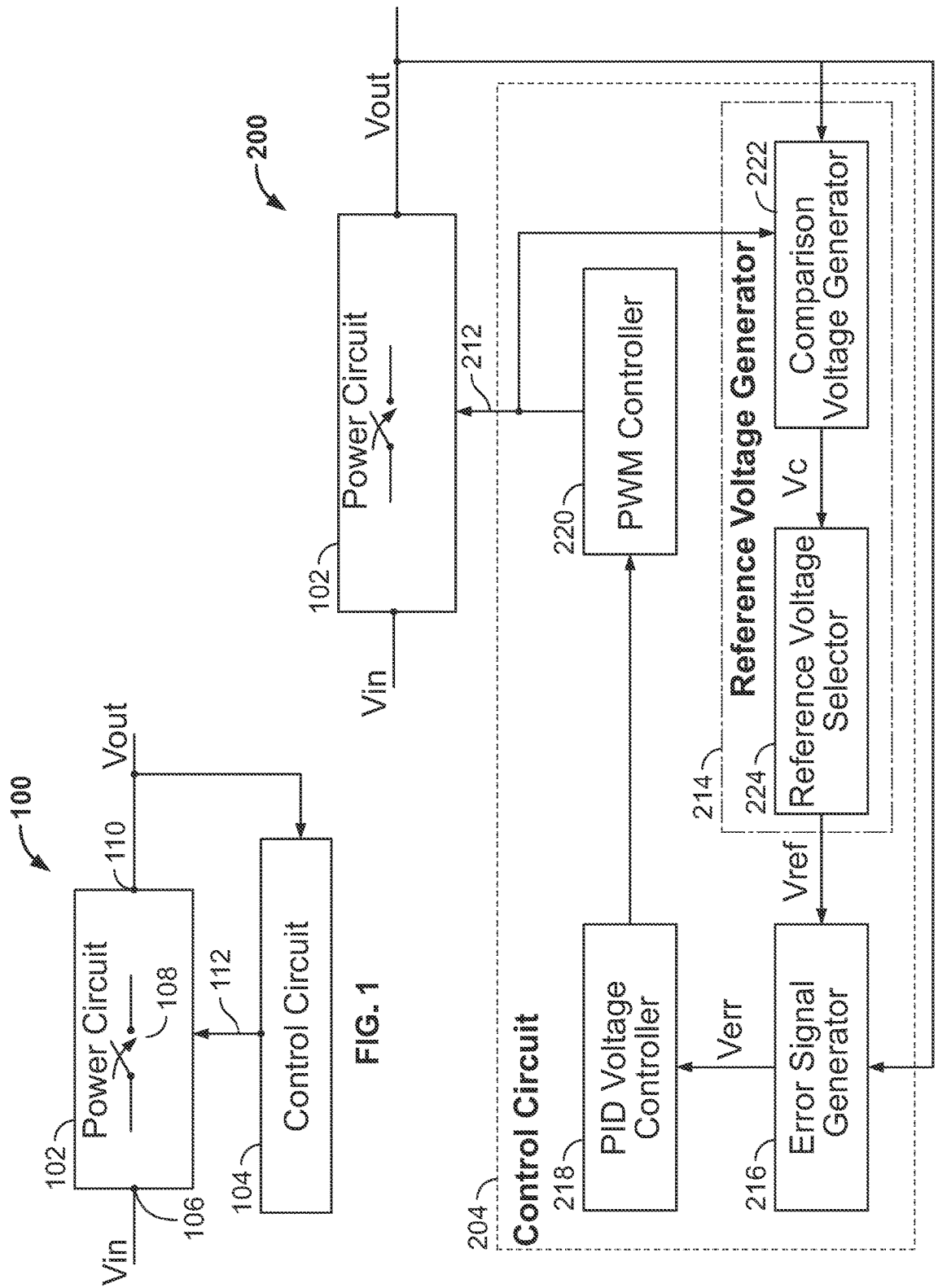
FIG. 1 is a block diagram of a SMPS including a power circuit and a control circuit for linearly adjusting an output voltage of the power circuit according to one example embodiment of the present disclosure.
FIG. 2 is a block diagram of a SMPS including a power circuit and a control circuit for adjusting a reference voltage as a function of a comparison voltage to linearly adjust an output voltage according to another example embodiment.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

A SMPS according to one example embodiment of the present disclosure is illustrated in FIG. 1 and indicated generally by reference number 100. As shown in FIG. 1, the SMPS 100 includes a power circuit 102 and a control circuit 104. The power circuit 102 includes an input 106 for receiving a variable input voltage Vin, a power switch 108, and an output 110 for providing an output voltage Vout. As shown in FIG. 1, the control circuit 104 is coupled to the power circuit 102 for regulating the output voltage Vout. The control circuit 104 is configured to generate a control signal 112 having a duty cycle for the power switch 108 using a reference voltage, determine if the duty cycle of the control signal 112 is within a defined range, sense one or more output parameters of the power circuit, and in response to determining the duty cycle of the control signal 112 is outside the defined range, adjust the reference voltage based on the one or more sensed output parameters of the power circuit 102 and the duty cycle of the control signal 112. The reference voltage is adjustable over time to thereby linearly adjust the output voltage Vout of the power circuit 102.

By linearly adjusting the output voltage Vout, the SMPS 100 provides a smooth and continuous regulated voltage to a load. As such, this regulated voltage is provided to the load without traditional step adjustments (e.g., stairs) as is conventional in known power supplies. For example, and as further explained below, if it is desirable to change the output voltage Vout, the control circuit 104 may control the power circuit 102 such that the output voltage Vout gradually changes over time. Even though the change in the output voltage Vout may be in a discrete manner, this change is small when compared to a conventional power supply employing traditional step adjustments where an output voltage experiences a sudden and significant change.

The rate of change in the output voltage Vout over time (e.g., the slope) may remain substantially the same, gradually increase or decrease, etc. For example, the output voltage Vout may change at one rate during one time period, and then change at a another (different) rate during another time period. In other examples, the output voltage Vout may change at the same rate throughout operation.

In some examples, the control circuit 104 may adjust the reference voltage without relying on an input parameter of the power circuit 102. For example, and as shown in FIG. 1, the control circuit 104 may adjust the reference voltage to linearly adjust the output voltage Vout without sensing the input voltage Vin and/or an input current of the power circuit 102. In such examples, if the power circuit 102 includes isolation circuitry (e.g., a transformer, etc.), all necessary sensed parameters for adjusting the reference voltage may be obtained from the secondary side of the power circuit 102. Additionally, the control circuit 104 may be implemented on the secondary side of the power circuit 102. This may provide an easier installation and better dynamic performance than a conventional power supply where some or all of its control circuit is located on the primary side.

The power circuit 102 of FIG. 1 may be controlled to provide a fully regulated output voltage. For example, and as further explained herein, the output voltage Vout is regulated at a particular value corresponding to the reference voltage. The output voltage Vout is constant for any given reference voltage. If the reference voltage is adjusted, the output voltage Vout is likewise adjusted according to the new reference voltage. As such, if the reference voltage is adjusted based on changing operating conditions such as a change in the input voltage Vin, a change in the load, etc., the control circuit 104 controls the power switch 108 to ensure the output voltage Vout is regulated according to the adjusted reference voltage.

The power circuit 102 may be designed to operate at a sufficiently high efficiency while providing the regulated output voltage Vout when the duty cycle of the control signal 112 is within the defined (e.g., an optimal) range. For example, the defined range of the duty cycle may be between about 92% and about 94%.

In some examples, a change in the input voltage Vin provided to the power circuit 102, a change in the load coupled to the power circuit 102, etc. may affect the output voltage Vout. As such, the duty cycle may be adjusted to ensure the output voltage Vout remains regulated at the reference voltage. If the adjusted duty cycle falls outside the defined range, the reference voltage may be adjusted causing the output voltage Vout to linearly adjust as explained herein. By changing the reference voltage, the duty cycle of the control signal 112 may be adjusted to ensure the duty cycle is within the defined range and the power circuit 102 is operated at the sufficiently high efficiency (e.g., between about 96% and about 98%, etc.). Thus, regardless of variations in the input voltage and/or the load, the power circuit 102 may operate at a high efficiency while having its output regulated.

As explained above, the control circuit 104 may adjust the reference voltage based on one or more sensed output parameters of the power circuit 102 and the duty cycle of the control signal 112. For example, the sensed output parameters may include the output voltage Vout as shown in FIG. 1. In other examples, the sensed output parameters may also include a sensed output current of the power circuit 102, as further explained below.

Additionally, the control circuit 104 may adjust the reference voltage based on one or more other parameters if desired. These parameters may be sensed, provided to the control circuit 104, stored in memory of the control circuit 104, etc. For example, and as explained herein, the control circuit 104 may adjust the reference voltage based on one or more defined parameters such as a preset duty cycle threshold, a maximum output voltage threshold, a minimum output voltage threshold, a maximum input voltage threshold, a minimum input voltage threshold, etc. In some examples, the control circuit 104 may adjust the reference voltage based on one or more circuit parameters such as a turns ratio of a transformer in the power circuit 102 (if employed), etc.

In some examples, the control circuit 104 may adjust the reference voltage based on a comparison voltage. For example, the control circuit 104 may determine a comparison voltage based on the sensed output parameters (e.g., the output voltage Vout, etc.) of the power circuit 102 and the duty cycle of the control signal 112, and compare the determined comparison voltage to a defined threshold such as the maximum output voltage threshold. In such examples, the control circuit 104 may set the reference voltage to equal a minimum value between the comparison voltage and the defined threshold.

For example, FIG. 2 illustrates a SMPS 200 including a control circuit 204 capable of adjusting a reference voltage Vref based on a determined comparison voltage. Specifically, and as shown in FIG. 2, the SMPS 200 includes the power circuit 102 of FIG. 1, and the control circuit 204 coupled to the power circuit 102. Similar to the control circuit 104 of FIG. 1, the control circuit 204 adjusts its reference voltage Vref over time to linearly adjust an output voltage Vout of the power circuit 102. For example, the control circuit 204 generates a control signal 212 for the power switch 108 using the reference voltage Vref, determines if a duty cycle of the control signal 212 is within a defined range, senses the output voltage Vout of the power circuit 102, and in response to determining the duty cycle of the control signal 212 is outside the defined range, determines a comparison voltage Vc based on the sensed output voltage Vout and the duty cycle, and adjusts the reference voltage Vref to equal a minimum value between the comparison voltage Vc and a maximum output voltage threshold.

In the example of FIG. 2, the control circuit 204 includes a reference voltage generator 214, an error signal generator 216, a proportional-integral-derivative (PID) controller 218, and a PWM controller 220. The reference voltage generator 214 includes a comparison voltage generator 222 and a reference voltage selector 224. As shown, the control circuit 204 senses the output voltage Vout of the power circuit 102 via one or more suitable sensors.

In the particular example of FIG. 2, the comparison voltage generator 222 receives various parameters such as the duty cycle (via the control signal 212) and the sensed output voltage Vout. The comparison voltage generator 222 then determines a comparison voltage Vc based on at least these parameters. For example, if the duty cycle of the control signal 212 is outside the defined range, the comparison voltage Vc may be calculated using equation (1) below.

$$V_c = \frac{V_{out}}{D} \cdot D\_set \quad (1)$$

In such examples, D is the duty cycle of the control signal 212 under the current conditions, and D_set is a preset duty cycle threshold. In some examples, the preset duty cycle threshold D_set may be set to equal a constant value slightly smaller than a maximum duty cycle of the control circuit 204. For example, the preset duty cycle threshold D_set may be roughly 94%, and the maximum duty cycle may be roughly 95%.

Next, the comparison voltage generator 222 outputs the determined comparison voltage Vc to the reference voltage selector 224. The reference voltage selector 224 compares the determined comparison voltage Vc to a maximum output voltage threshold Vout_max (e.g., stored in memory). In some examples, the maximum output voltage threshold Vout_max may be selected based on design characteristics. In the particular example of FIG. 2, the reference voltage selector 224 may select and output the lessor of the comparison voltage Vc and the maximum output voltage threshold Vout_max as being the reference voltage Vref. Thus, in this particular example, the new (adjusted) reference voltage Vref is equal the minimum value between the comparison voltage Vc and the maximum output voltage threshold Vout_max, as shown below in equation (2).

$$V_{ref} = \text{MIN}\left(\frac{V_{out}}{D} \cdot D\_set, V_{out\_max}\right) \tag{2}$$

This adjusted reference voltage Vref (e.g., the new set point for the output voltage Vout) is then provided to the error signal generator 216. The error signal generator 210 compares the reference voltage Vref with the output voltage Vout to generate an error signal Verr based on the difference between the reference voltage Vref and the output voltage Vout. The PID controller 218 may calculate a new duty cycle for the control signal 212 based the error signal Verr to control the power switch 108 of the power circuit 102. The PWM controller 220 (e.g., a driver) generates the control signal 212 (e.g., a PWM control signal) with the duty cycle for controlling the power switch 108. Alternatively, the control circuit 204 may include one or more other control components in addition to or in place of the PID controller 218 for calculating the new duty cycle, the PWM controller 220 for generating the control signal 212, etc.

Figure 3:
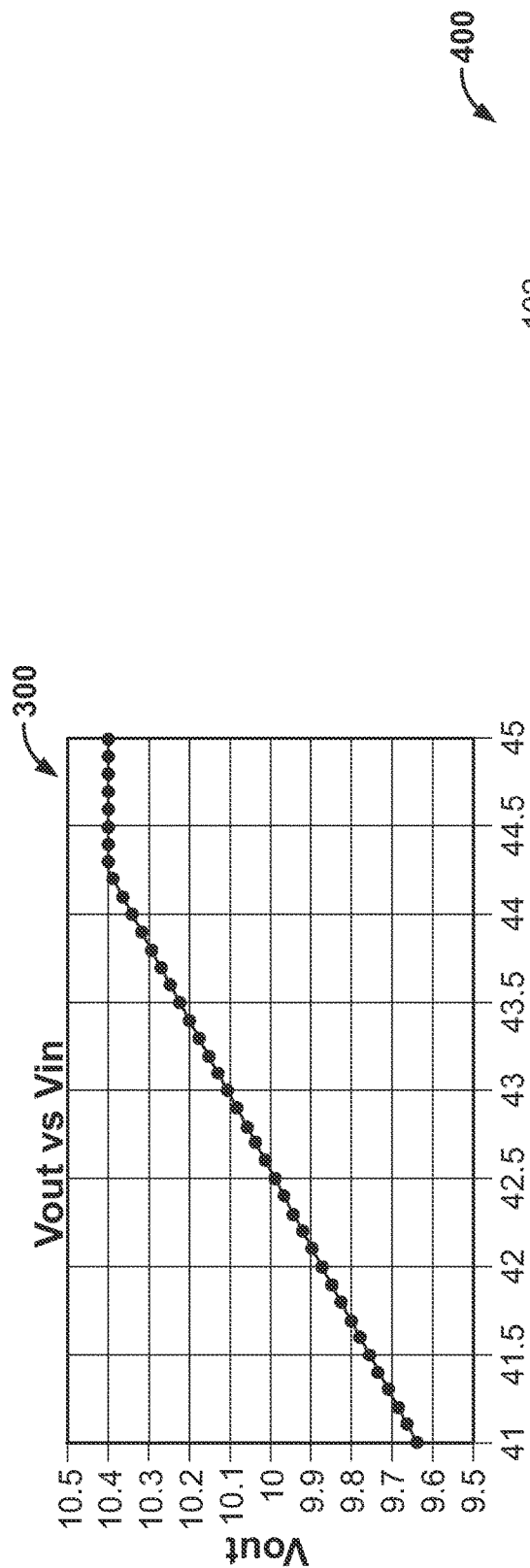
FIG. 3 is a graph of the output voltage of the power circuit of FIG. 2.

By changing the reference voltage Vref as explained above, the power circuit's output voltage Vout of FIG. 2 is linearly adjusted over time. For example, FIG. 3 illustrates a graph 300 of the output voltage Vout vs the input voltage Vin of the power circuit 102 of FIG. 2. In the particular example of FIG. 3, the maximum output voltage threshold Vout_max is set to equal 10.4 VDC, and the preset duty cycle threshold D_set is set to equal 0.94. As shown in FIG. 3, the output voltage Vout adjusts linearly between about 9.65 VDC and about 10.4 VDC with substantially the same slope when the input voltage Vin ranges between about 41 VDC and about 44.25 VDC, and then levels off at 10.4 V (e.g., the maximum output voltage threshold Vout_max) when the input voltage Vin reaches about 44.25 VDC.

Figure 4:
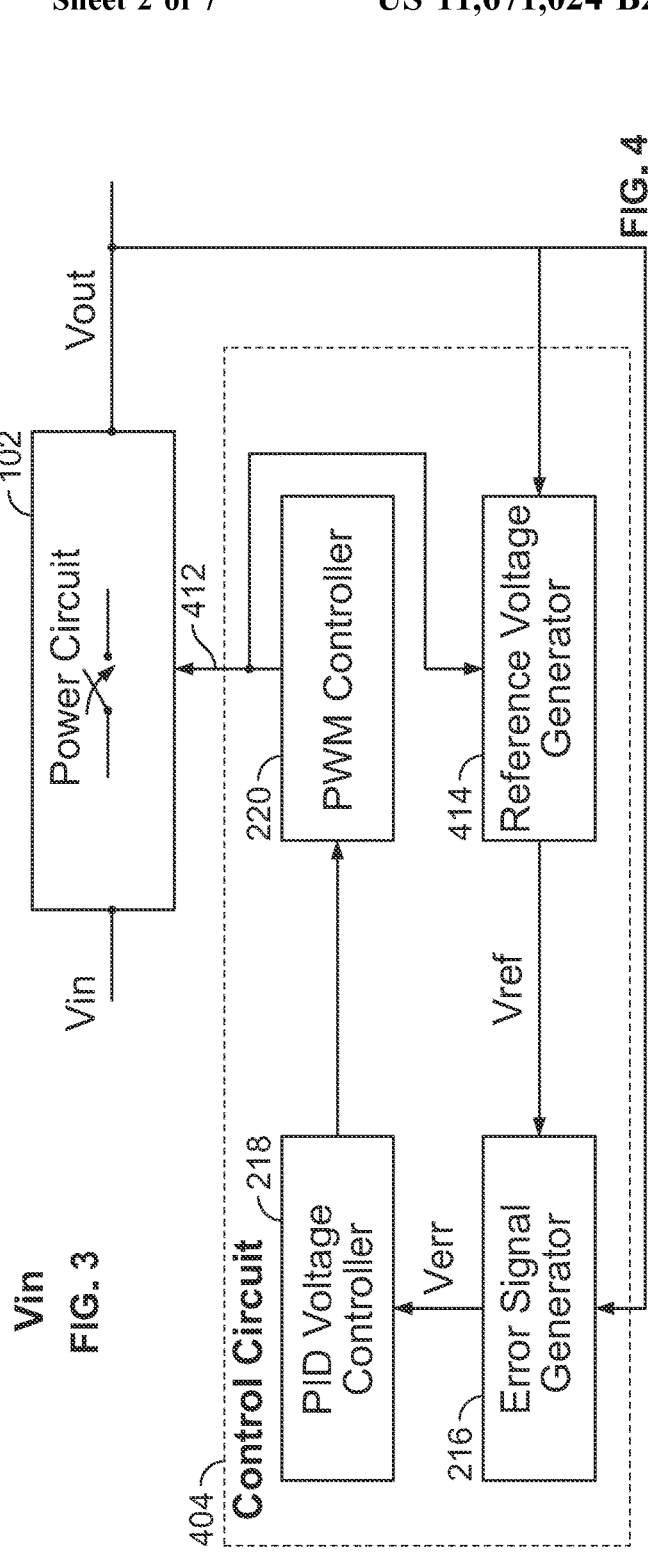
FIG. 4 is a block diagram of a SMPS including a power circuit and a control circuit for adjusting a reference voltage as a function of an output voltage and a duty cycle to linearly adjust the output voltage according to yet another example embodiment.

In some examples, it may be acceptable for the output voltage to vary in a defined range. In such examples, the reference voltage may be adjusted so that the output voltage is a lower value when the input voltage is low and a higher value when the input voltage is high. This may ensure the duty cycle is as large as possible to improve efficiency. For example, FIG. 4 illustrates a SMPS 400 including a control circuit 404 capable of adjusting a reference voltage Vref so that the output voltage varies in a defined range. Specifically, and as shown in FIG. 4, the SMPS 400 includes the power circuit 102 of FIG. 1, and the control circuit 404 coupled to the power circuit 102 for proving a control signal 412 to the power switch 108. Similar to the control circuits 104, 204 of FIGS. 1 and 2, the control circuit 404 adjusts its reference voltage Vref over time to linearly adjust the output voltage Vout of the power circuit 102.

In the example of FIG. 4, the control circuit 404 is substantially similar to the control circuit 204 of FIG. 2, but includes a different reference voltage generator. Specifically, the control circuit 404 of FIG. 4 includes a reference voltage generator 414. As shown in FIG. 4, the reference voltage generator 414 receives the duty cycle (via the control signal 412) and the sensed output voltage Vout. If the duty cycle of the control signal 412 is outside a defined range, the reference voltage generator 414 adjusts the reference voltage Vref by determining a new reference voltage Vref. For example, the reference voltage generator 414 may calculate the new reference voltage Vref using equation (3) below.

$$V_{ref} = \frac{V_{out}}{D} \cdot A + B \tag{3}$$

In such examples, D is the duty cycle of the control signal 412 under the current conditions, A is a constant value for adjusting the slope of output voltage Vout (if needed), and B is a constant number for setting an offset of the output voltage Vout (if needed).

In some examples, the constant values A, B of equation (3) may be determined based on various defined thresholds and/or characteristics of the power circuit 102. For example, if the power circuit 102 includes a transformer, the constant values A, B may be determined based on a turns ratio of the transformer. In such examples, the constant value A may be determined using equation (4) below.

$$A = N_{PS} \cdot \frac{V_{out\_max} - V_{out\_min}}{V_{in\_max} - V_{in\_min}} \tag{4}$$

In this example, Nps is the turns ratio of the power circuit's transformer (not shown in FIG. 4), Vout_max is a maximum output voltage threshold, Vout_min is a minimum output voltage threshold, Vin_max is a maximum input voltage threshold, and Vin_min is a minimum input voltage threshold. The maximum output voltage threshold Vout_max and the minimum output voltage threshold Vout_min may be equal to desired maximum and minimum voltages at zero load. The maximum input voltage threshold Vin_max and the minimum input voltage threshold Vin_min may be the input voltages when the output voltage Vout is at the maximum output voltage threshold Vout_max and the minimum output voltage threshold Vout_min, respectively.

Additionally, the constant value B may be determined based on the turns ratio Nps, the constant value A, the minimum output voltage threshold Vout_min, and the minimum input voltage threshold Vin_min. For example, the constant value B may be determined by using equation (5) below.

$$B = V_{out\_min} - \frac{A}{N_{PS}} \cdot V_{in\_min} \tag{5}$$

After generating the adjusted reference voltage Vref (e.g., the new set point for the output voltage Vout), the reference voltage generator 414 of FIG. 4 provides the adjusted reference voltage Vref to the error signal generator 216. The error signal generator 210 compares the reference voltage Vref with the sensed output voltage Vout to generate the error signal Verr for the PID controller 218, as explained above. The PID controller 218 may calculate a new duty cycle for the control signal 412 based the error signal Verr, and the PWM controller 220 generates the control signal 412 (e.g., a PWM control signal) with the duty cycle for controlling the power switch 108.

Figure 5:
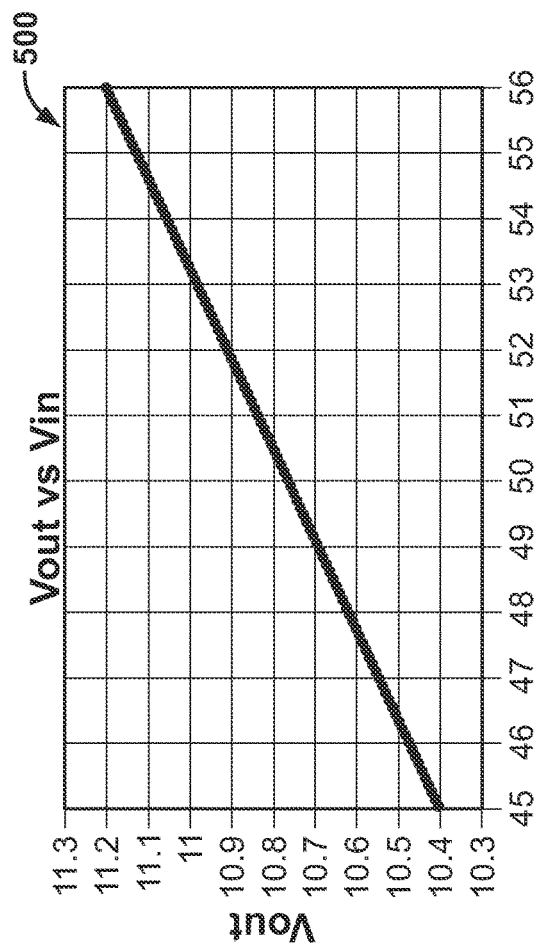
FIG. 5 is a graph of the output voltage of the power circuit of FIG. 4.

By changing the reference voltage Vref as explained above, the output voltage Vout of FIG. 4 is linearly adjusted over time. For example, FIG. 5 illustrates a graph 500 of the output voltage Vout vs the input voltage Vin of the power circuit 102 of FIG. 4. In the particular example of FIG. 5, the maximum output voltage threshold Vout_max is set to equal 11.2 VDC, the minimum output voltage threshold Vout_min is set to equal 10.4 VDC, the maximum input voltage threshold Vin_max is 56 VDC, the minimum input voltage threshold Vin_min is 45 VDC, and the turns ratio Nps is 4. As shown in FIG. 5, the output voltage Vout adjusts linearly between 10.4 VDC and 11.2 VDC with substantially the same slope when the input voltage Vin ranges between 45 VDC and 56 VDC.

Figure 6:
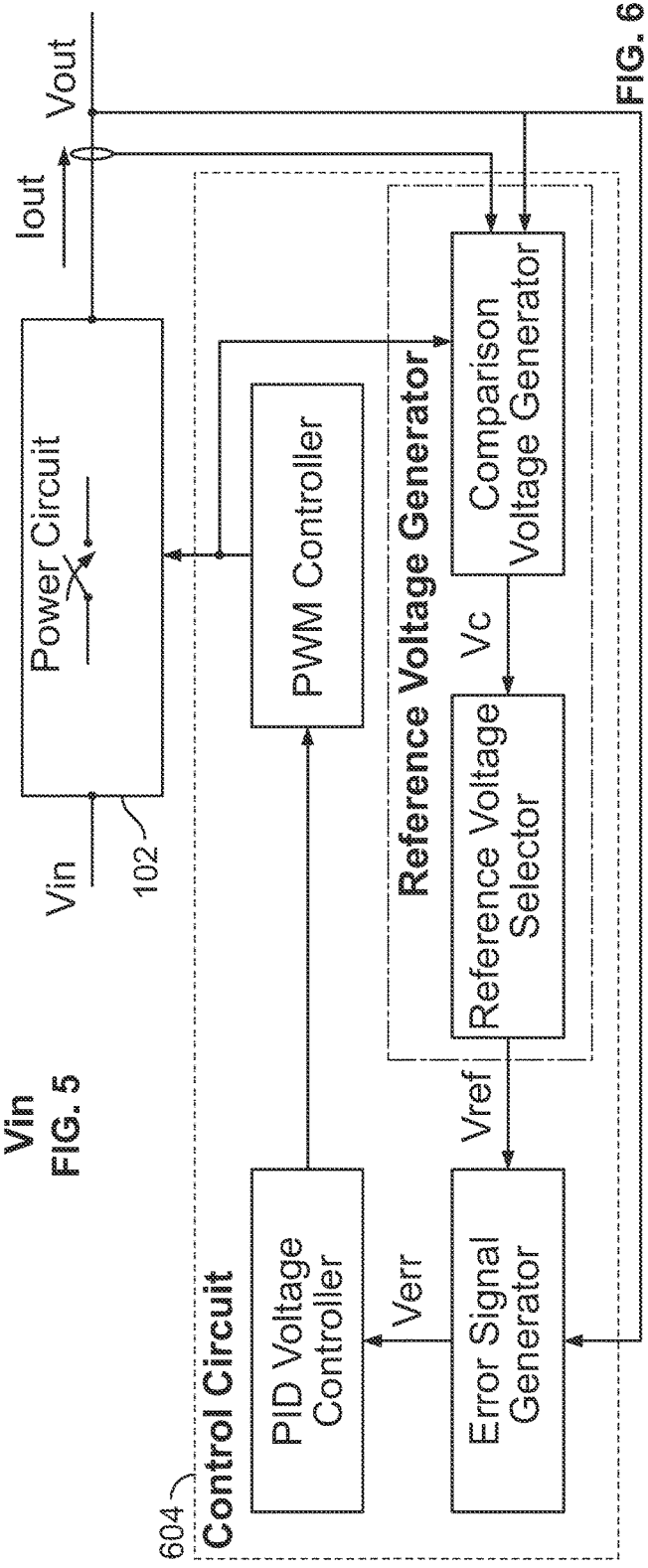
FIG. 6 is a block diagram of a SMPS including a power circuit and a control circuit for adjusting a reference voltage as a function of a comparison voltage generated based on an output current to linearly adjust an output voltage according to another example embodiment.
Figure 7:
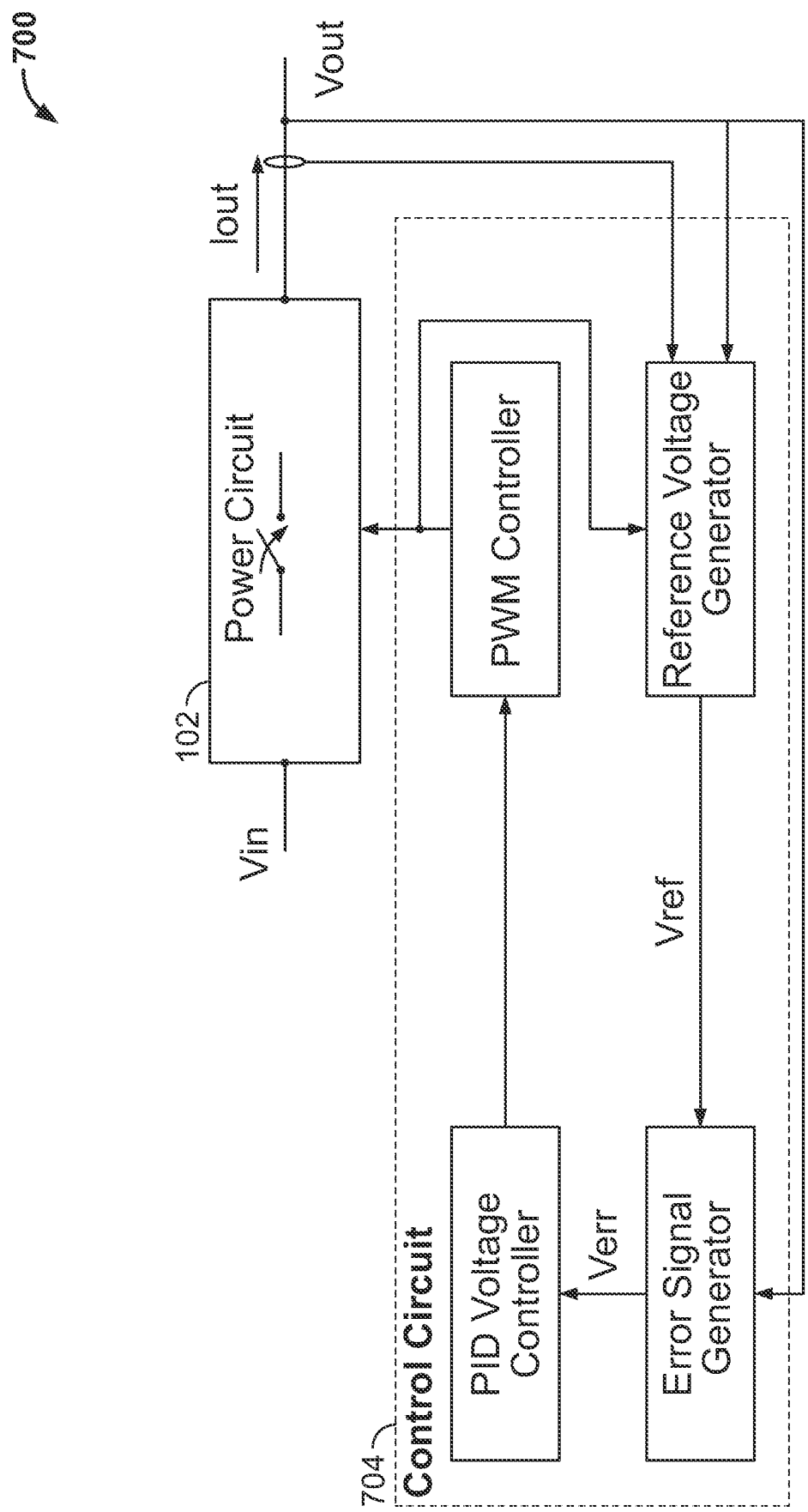
FIG. 7 is a block diagram of a SMPS including a power circuit and a control circuit for adjusting a reference voltage as a function of an output current to linearly adjust an output voltage according to yet another example embodiment.

In some examples, it may be desirable for the control circuits disclosed herein to compensate for output loading. In such examples, the control circuits may adjust their reference voltages based on multiple sensed output parameters. For example, FIG. 6 illustrates a SMPS 600 including the power circuit 102 of FIG. 2, and a control circuit 604 similar to the control circuit 204 of FIG. 2. Likewise, FIG. 7 illustrates a SMPS 700 including the power circuit 102 of FIG. 2, and a control circuit 704 similar to the control circuit 404 of FIG. 4. However, in the examples of FIGS. 6 and 7, the control circuits 604, 704 receive a sensed output voltage Vout and a sensed output current Iout.

In such examples, equations (2), (3) above for adjusting reference voltages may be modified to compensate for output loading. For example, equations (2), (3) may be modified as equations (6), (7), respectively, below.

$$V_{ref} = \mathrm{MIN}\left(\frac{V_{out} + k \cdot Iout}{D + \delta} \cdot D\_set, V_{out\_max}\right) \quad (6)$$

$$V_{ref} = \frac{V_{out} + k \cdot Iout}{D + \delta} \cdot A + B \quad (7)$$

In these examples, k is a coefficient for providing output loading compensation, δ is a coefficient for providing duty cycle compensation at light loads, and Iout is the sensed output current of the power circuit 102.

In some scenarios, it may be desirable to employ the teachings disclosed herein in SMPS applications having two or more power circuits coupled in parallel. For example, a SMPS may include two or more power circuits having their outputs coupled together without employing an ORing circuit or the like. This configuration is commonly referred to as a direct-parallel application. In such examples, the SMPS may not include a current sharing bus coupled between the power circuits. This may be particularly useful in intermediate bus converter (IBC) applications (e.g., board mount power (BMP) IBC applications). In such examples, it is important to minimize the difference between the output voltages provided by the power circuits. Conventional power supplies employing output voltage step adjustments may be unable to achieve this. For example, when step adjustments are employed, the output voltages of the power circuits may remain in different voltage levels due to calculation errors, sense errors, etc., thereby causing large differences between the output voltages. In contrast, and as further explained below, the difference between linearly adjusted output voltages in power circuits coupled in parallel may be sufficiently low.

For example, when outputs of two power circuits are coupled in parallel, the adjusted (new) output reference voltages Vrefs (e.g., calculated using the equations explained above) for the power circuits are typically not the same. This may be true even if both power circuits are operating under the same conditions. If the difference between the new output reference voltages Vrefs is large, current in one of the power circuits may be significantly larger than current in the other power circuit. As such, current sharing between the power circuits is unsatisfactory.

In some examples, an error of the new output reference voltages Vref for one of the power circuits may be caused by variables (e.g., the sensed output voltage Vout and the sensed duty cycle D) in the above equations. This error may contribute to the difference between the new output reference voltages Vrefs explained above. A portion of the error caused by sensing the output voltage Vout, and a portion of the error caused by sensing the duty cycle D may be separated into two equations (8), (9) below. Equations (8), (9) may be derived from, for example, equation (3) above.

$$\frac{\partial Vref}{\partial V_{out}} = \frac{\partial\left(\frac{V_{out}}{D} \cdot A + B\right)}{\partial V_{out}} = \frac{1}{D} \cdot A \approx \frac{\Delta V_{new\_1}}{\Delta V_{out}} \quad (8)$$

$$\frac{\partial Vref}{\partial D} = \frac{\partial\left(\frac{V_{out}}{D} \cdot A + B\right)}{\partial D} = -\frac{V_{out}}{D^2} \cdot A \approx \frac{\Delta V_{new\_2}}{\Delta D} \quad (9)$$

In this example, $\Delta V\_new\_1$ is an error realized when sensing the output voltage Vout, and $\Delta V\_new\_2$ is an error realized when sensing the duty cycle D. Additionally, A is a constant value for adjusting the slope of output voltage Vout (as explained above), D is the duty cycle of a control signal provided to a power switch under the current conditions, ΔVout is a difference in sensed output voltages of the same power circuit, and ΔD is a difference in sensed duty cycles of a control signal for the same power circuit.

Equations (8), (9) above may be modified to solve for the output voltage error $\Delta V\_new\_1$ and the duty cycle error $\Delta V\_new\_2$, as shown in equations (10), (11) below.

$$\Delta V_{new\_1} = \frac{1}{D} \cdot A \cdot \Delta V_{out} \quad (10)$$

$$\Delta V_{new\_2} = -\frac{V_{out}}{D^2} \cdot A \cdot \Delta D \quad (11)$$

The output voltage error $\Delta V\_new\_1$ and the duty cycle error $\Delta V\_new\_2$ may then be used to calculate the error $\Delta V\_new$ of the new output reference voltages Vref for one of the power circuits, as shown below in equation (12). This calculated error $\Delta V\_new$ may be used to determine whether the difference between the new output reference voltages Vrefs is satisfactory.

$$\Delta V_{new} = \sqrt{\Delta V_{new\_1}^2 + \Delta V_{new\_2}^2} \quad (12)$$

As one example, equations (10)-(12) above may be applied to the example of FIGS. 4 and 5. For example, in FIGS. 4 and 5, the output voltage Vout may be 10.4 VDC when the input voltage Vin is 45 VDC. In such circumstances, the duty cycle D may be 0.9244 when the power circuit 102 of FIG. 4 is in a static condition, and the constant value A may be 0.2909. The switching frequency may be, for example, 100 kHz. If the precision of the analog to digital conversion (ADC) of the reference voltage is 0.1%, the difference in the sensed output voltages ΔVout may be 10.4 mV (e.g., 10.4 V*0.1%). In such examples, the error ΔV_new_1 may be calculated to equal 3.27 mV when using equation (10) above.

Additionally, the precision of the PWM control signal 412 may be, for example, 250 picoseconds and the change in the duty cycle ΔD may be 0.00005. In such examples, the error ΔV_new_2 may be calculated to equal 0.177 mV when using equation (11) above.

When the determined errors ΔV_new_1, ΔV_new_2 are applied to equation (12) above, the output voltage reference error ΔV_new may be equal to about 3.28 mV. Thus, in this particular example, the difference between the new output reference voltages Vrefs in the power circuits (and as a result the output voltages of the power circuits) may be 6.56 mV (2*3.28 mV). This difference may be acceptable in applications including two or more power circuits coupled in parallel, and substantially lower than conventional power circuits employing step adjustments. For example, conventional power circuits coupled in parallel and employing step adjustments may have an output voltage difference of 250 mV. As such, when the power circuits are controlled to linearly adjust their output voltages, the difference between the new output reference voltages Vrefs may be sufficiently low.

Figure 8:
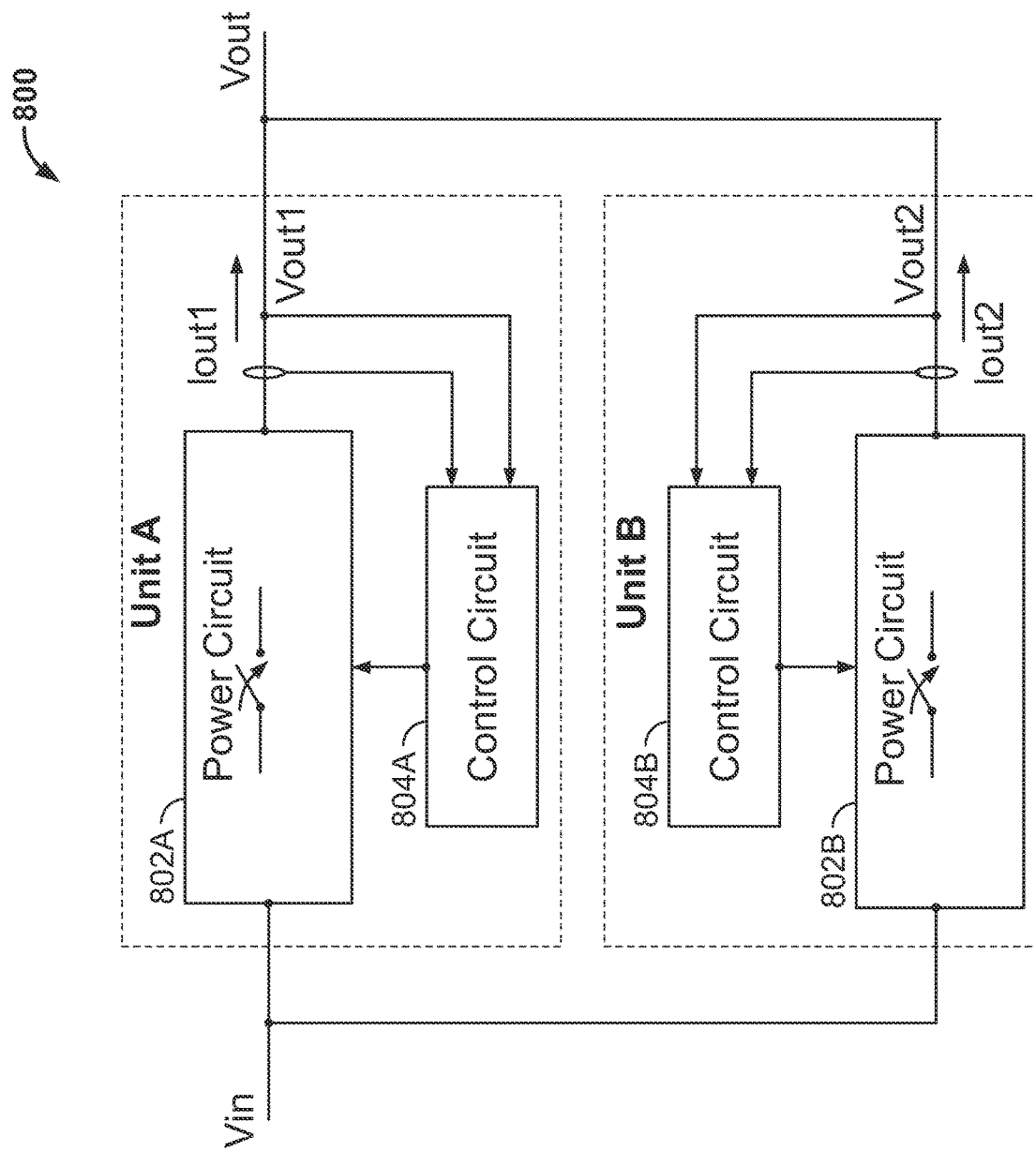
FIG. 8 is a block diagram of a SMPS including two power circuits coupled in parallel, and control circuits for linearly adjusting output voltages of the power circuits according to another example embodiment.

FIG. 8 illustrates one example of a SMPS 800 including two power circuits coupled in parallel, and having their output voltages adjusted linearly as explained herein. For example, the SMPS 800 includes power units A, B each including a power circuit 802A, 802B and a control circuit 804A, 804B coupled to its corresponding power circuit 802A, 802B. As shown, each power circuit 802A, 802B includes at least one power switch controlled by its corresponding control circuit 804A, 804B. In some examples, the control circuits 804A, 804B may be in communication with each other if desired.

As shown in the example of FIG. 8, the control circuits 804A, 804B are dedicated control circuits located within the power units A, B, respectively. Although the power circuits 802A, 802B of FIG. 8 are shown as being controlled by dedicated control circuits 804A, 804B, it should be apparent to those skilled in the art that both power circuits 802A, 802B may be controlled by the same control circuit if desired. In such examples, the control circuit may be external to the power units A, B, located within one of the power units A, B, etc.

The control circuits 804A, B each may be similar to any one of the control circuits disclosed herein. For example, one or both control circuits 804A, 804B may include similar components as the control circuits 204, 604, and adjust their respective reference voltage Vref based on a comparison voltage as explained herein. In other examples, one or both control circuits 804A, 804B may include similar components as the control circuits 404, 704.

In some examples, one or both control circuits 804A, 804B may adjust their respective reference voltage Vref based on an output current sharing parameter of the power circuit 802A and/or the power circuit 802B. For example, the control circuit 804A may adjust the reference voltage Vref for the power circuit 802A and/or the control circuit 804B may adjust the reference voltage Vref for the power circuit 802B based on droop current sharing parameters and/or other suitable output current sharing parameters. In such examples, equations (6), (7) above may be modified to account for the output current sharing parameter to adjust the reference voltage Vref for the power circuit 802A and/or the power circuit 802B. For example, if the control circuit 804A includes similar components as the control circuits 204, 604, and adjusts its reference voltage Vref based on a droop current sharing parameter of the power circuit 802A, equation (6) above may be modified into equation (13) below.

$$V_{ref} = \text{MIN}\left(\frac{V_{out} + k \cdot I_{out}}{D + \delta} \cdot D\_set - R_{droop} \cdot \text{I\_out},\right.$$
$$\left. V_{out\_max} - R_{droop} \cdot \text{I\_out}\right) \quad (13)$$

Figure 9:
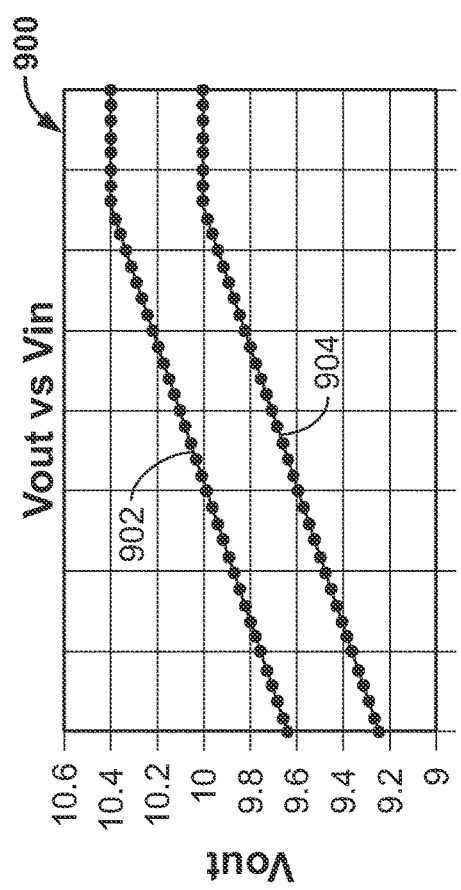
FIG. 9 is a graph of the output voltage of the power circuit of FIG. 8 when the control circuit linearly adjusts one or both output voltages based on a reference voltage generated as a function of a comparison voltage according to yet another example embodiment.

In such examples, Vout is the output voltage Vout1 of the power circuit 802A, Iout is the output current Iout1 of the power circuit 802A, and Rdroop is an equivalent droop resistance of the power circuit 802A By changing the reference voltage Vref as explained above, the output voltage Vout of the power circuit 802A may be linearly adjusted over time. For example, FIG. 9 illustrates a graph 900 of the output voltage Vout1 vs the input voltage Vin of the power circuit 802A of FIG. 8 when using the equation (13) above. In the example of FIG. 9, the maximum output voltage threshold Vout_max is set to equal 10.4 VDC, the coefficients k, δ are set to equal zero, and the preset duty cycle threshold D_set is set to equal 0.94. Additionally, the equivalent droop resistance Rdroop may be equal to 4 milliohms, and the output current Iout may be equal to 100 amps (at full load).

In such examples, the output voltage Vout1 of the power circuit 802A adjusts linearly between about 9.65 VDC and about 10.4 VDC with substantially the same slope when the input voltage Vin ranges between about 41 VDC and about 44.25 VDC during a no load condition (line 902 of FIG. 9). The output voltage Vout1 then levels off at 10.4 V (e.g., the maximum output voltage threshold Vout_max) when the input voltage Vin reaches about 44.25 VDC. Likewise, at a full load condition (line 904 of FIG. 9), the output voltage Vout adjusts linearly between about 9.25 VDC and about 10 VDC with substantially the same slope, and then levels off at 10 V when the input voltage Vin reaches about 44.25 VDC.

If the control circuit 804A includes similar components as the control circuits 404, 704, and adjusts its reference voltage Vref based on a droop current sharing parameter of the power circuit 802A, equation (7) above may be modified into equation (14) below.

$$V_{ref} = \frac{V_{out} + k \cdot I_{out}}{D + \delta} \cdot A + B - R_{droop} \cdot I_{out} \quad (14)$$

Figure 10:
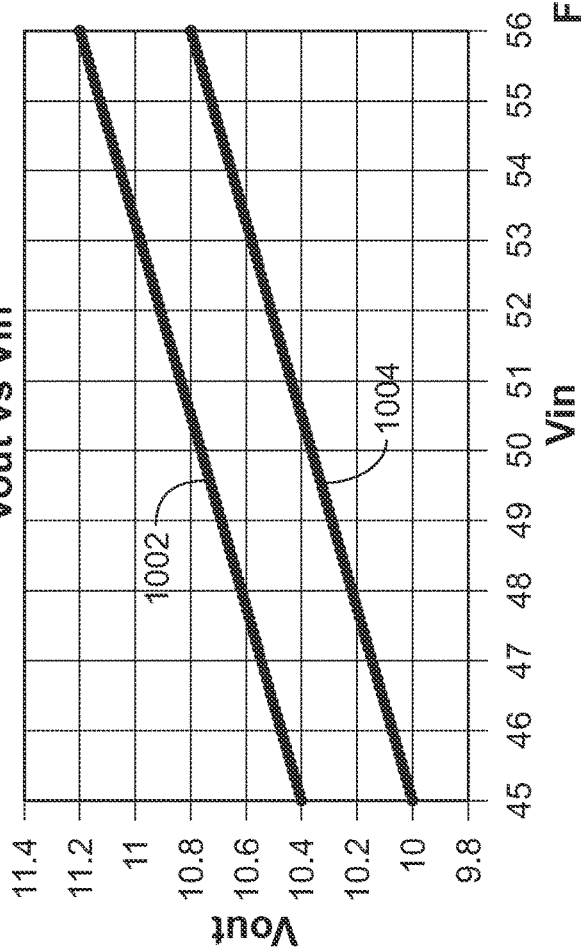
FIG. 10 is a graph of the output voltage of the power circuit of FIG. 8 when the control circuit linearly adjusts one or both output voltages based on a reference voltage generated as a function of an output voltage and a duty cycle according to another example embodiment.

When the reference voltage Vref is adjusted as shown in equation (14), the output voltage Vout of the power circuit 802A may be linearly adjusted over time. For example, FIG. 10 illustrates a graph 1000 of the output voltage Vout1 vs the input voltage Vin of the power circuit 802A of FIG. 8 when equation (14) is employed. In the example of FIG. 10, the maximum output voltage threshold Vout_max is set to equal 11.2 VDC, the minimum output voltage threshold Vout_min is set to equal 10.4 VDC, the maximum input voltage threshold Vin_max is 56 VDC, the minimum input voltage threshold Vin_min is 45 VDC, the turns ratio Nps is 4, and the coefficients k, δ are set to equal zero. Additionally, the equivalent droop resistance Rdroop may be equal to 4 milliohms, and the output current Iout may be equal to 100 amps (at full load).

In such examples, the output voltage Vout1 adjusts linearly between 10.4 VDC and 11.2 VDC with substantially the same slope when the input voltage Vin ranges between 45 VDC and 56 VDC during a no load condition (line 1002 of FIG. 10). Additionally, during a full load condition (line 1004 of FIG. 10), the output voltage Vout1 adjusts linearly between 10 VDC and 10.8 VDC with substantially the same slope.

Although equations (13), (14) above are explained in relation to the power circuit 802A, it should be apparent to those skilled in the art that these equations may be applicable to adjusting the reference voltage for the power circuit 802B if desired.

The power circuits disclosed herein may include any suitable DC-DC switching converter topology having one or more power switches. For example, the power circuits may have buck, boost, forward, double forward, flyback, push-pull, half-bridge, full-bridge, etc. topologies (including their resonant counterparts where applicable). The half-bridge and the full-bridge topologies may be phase-shifted, hard-switching, etc. Additionally, the power circuits may include isolated or non-isolated converter topologies. In some examples, the power circuits may be employed as an intermediate bus converter.

Figure 11:
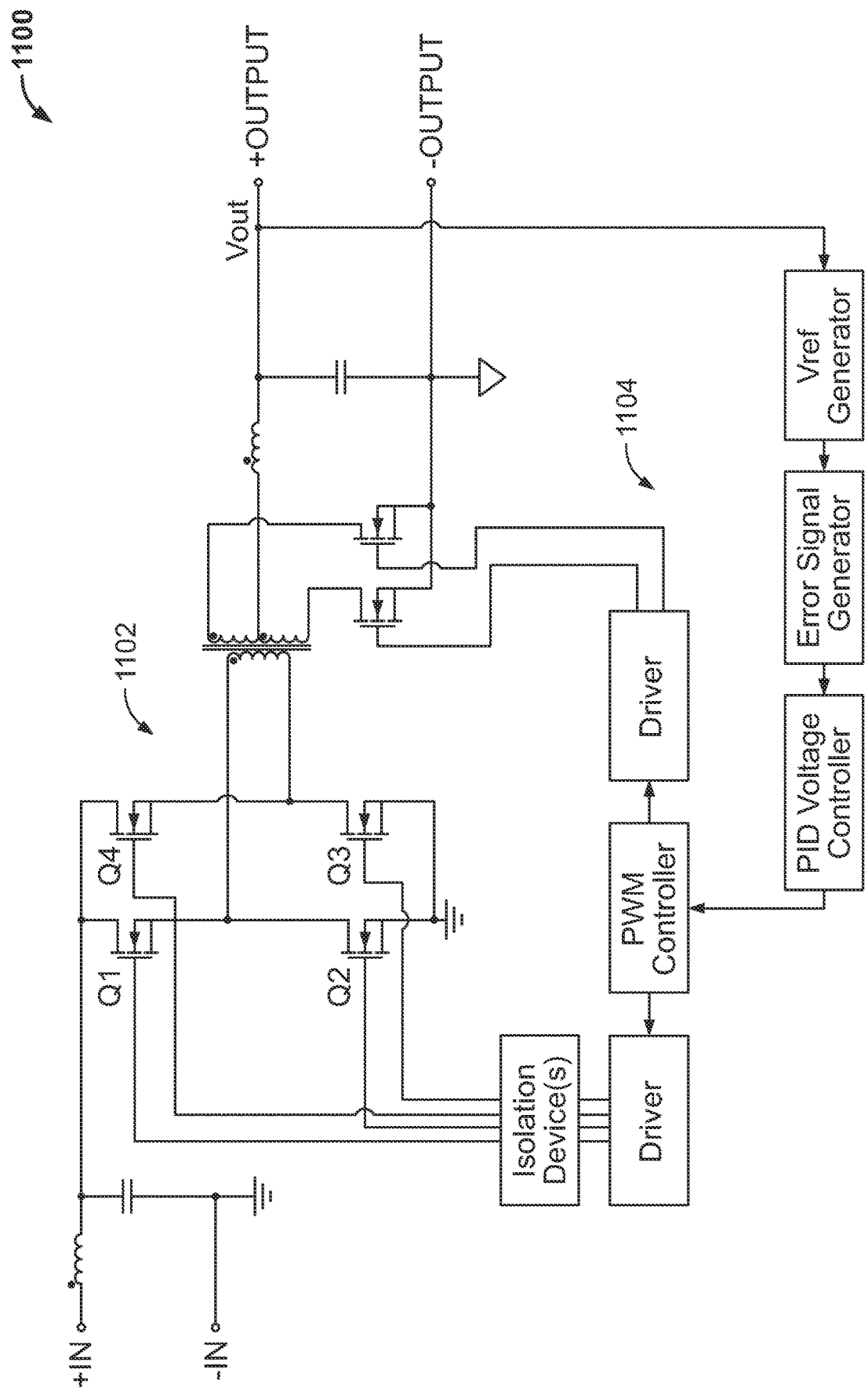
FIG. 11 is schematic diagram of a SMPS including an isolated forward converter employable in any one of the power circuits of FIGS. 1, 2, 4 and 6-8.

For example, FIG. 11 illustrates a SMPS 1100 including a power circuit 1102 and a control circuit 1104. As shown, the power circuit 1102 of FIG. 11 incldes an isolated forward converter having a transformer, power switches Q1, Q2, Q3, Q4 coupled to a primary side of the transformer, and a rectifying circuit coupled to a secondary side of the transformer. The power switches Q1, Q2, Q3, Q4 are arranged in a full-bridge configuration.

The control circuits disclosed herein may include an analog control circuit, a digital control circuit, or a hybrid control circuit (e.g., a digital control unit and an analog circuit). The digital control circuits may be implemented with one or more types of digital control circuitry. For example, the digital control circuits each may include a digital controller such as a digital signal controller (DSC), a digital signal processor (DSP), a microcontroller unit (MCU), a field-programmable gate array (FPGA), an application-specific IC (ASIC), etc. In some examples, it may be preferable to implement at least the PID voltage controller and/or the PWM controller shown in FIGS. 2, 4, 6 and 7 with digital controller(s). As such, the control methods disclosed herein may be at least partially (and sometimes entirely) performed by a digital controller.

If, for example, the control circuit is a digital control circuit, the control circuit may be implemented with one or more hardware components and/or software. For example, instructions for performing any one or more of the features disclosed herein may be stored in and/or transferred from a non-transitory computer readable medium, etc. to one or more existing digital control circuits, new digital control circuits, etc. In such examples, one or more of the instructions may be stored in volatile memory, nonvolatile memory, ROM, RAM, one or more hard disks, magnetic disk drives, optical disk drives, removable memory, non-removable memory, magnetic tape cassettes, flash memory cards, CD-ROM, DVDs, cloud storage, etc.

The control circuits may be on the secondary side of an isolation barrier if, for example, the power circuit includes an isolation transformer. In such cases, the control signal(s) from the control circuits may cross the isolation barrier (e.g., via one or more isolation devices such as isolation transformers, opto-couplers, etc.) to control power switches on the primary side of the power circuit. For example, and as shown in FIG. 11, control signals from the control circuit 1104 are provided to the power switches Q1, Q2, Q3, Q4 on the primary side of the power circuit 1102 via one or more isolation devices.

In addition, the control methods disclosed herein may be repeated as desired. For example, the control circuits may be able to successively perform the methods as desired and/or if applicable.

The teachings herein may be applicable in any suitable SMSP having one or more power circuits. In some examples, the SMSP may form at least a part of a 400 W IBC having a variable input voltage ranging between about 45 VDC and about 56 VDC, and a fully regulated output voltage of about 10.4 VDC.

By employing the control methods disclosed herein, a power circuit may be controlled to provide a fully regulated output voltage that is linearly adjusted as necessary in a smooth and continuous manner. The output voltage may be adjusted without step adjustments. In such examples, the power circuit may operate at a high efficiency while having its output regulated regardless of variations in an input voltage and/or a load, as explained herein. Because the regulated output voltage is linearly adjusted, the teachings herein may be employed in applications including multiple power circuits coupled in parallel. Additionally, the control methods for linearly adjusting the output voltage may be implemented based on one or more simple and unified equations that are applicable to the entire operational range of the power circuit. These control methods may be easily implemented in, for example, firmware of new and/or existing control circuits. Further, sensed parameters used in the control methods may be obtained entirely from a secondary side of power circuit. As such, the control methods may be easily implemented in secondary side control circuits without sensing input parameters and/or passing sensed input parameters through an isolation barrier.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switched mode power supply comprising:
a power circuit comprising a power switch and an output for providing an output voltage; and
a control circuit coupled to the power circuit for regulating the output voltage and configured to:
control the power switch using a control signal, the control signal based on a reference voltage;
determine if a duty cycle of the control signal is within a defined range;
sense the output voltage; and
if the duty cycle is outside the defined range:
determine a comparison voltage based on the output voltage and the duty cycle; and adjust the reference voltage to equal the lessor of the comparison voltage and a maximum output voltage threshold of the power circuit.

2. The switched mode power supply of claim 1, wherein the control circuit is configured to determine the comparison voltage not based on a sensed input parameter of the power circuit.

3. The switched mode power supply of claim 1, wherein the control circuit is configured to adjust the reference voltage over time to linearly adjust the output voltage.

4. The switched mode power supply of claim 1, wherein the control circuit is configured to adjust the reference voltage based on a preset duty cycle threshold.

5. The switched mode power supply of claim 1, wherein the control circuit is configured to adjust the reference voltage based on one or more of:
   a defined maximum output voltage threshold of the power circuit;
   a defined minimum output voltage threshold of the power circuit;
   a defined maximum input voltage threshold of the power circuit; and
   a defined minimum input voltage threshold of the power circuit.

6. The switched mode power supply of claim 5, wherein the power circuit includes a transformer having a turns ratio; and
   wherein the control circuit is configured to adjust the reference voltage based on the turns ratio of the transformer.

7. The switched mode power supply of claim 1, wherein the control circuit is further configured to:
   sense an output current of the power circuit; and
   adjust the reference voltage further based on the output current.

8. The switched mode power supply of claim 1, wherein:
   the power circuit is a first power circuit;
   the switched mode power supply further comprises a second power circuit coupled in parallel with the first power circuit; and;
   the control circuit is configured to further adjust the reference voltage based on an output current sharing parameter of the first power circuit or the second power circuit.

9. The switched mode power supply of claim 8 wherein the output current sharing parameter includes a droop current sharing parameter.

10. A method of regulating an output voltage of a power circuit including a voltage input, a power switch, a voltage output for providing the output voltage, the method comprising:
    generating a control signal for the power switch using a reference voltage, the control signal having a duty cycle;
    determining if the duty cycle of the control signal is within a defined range;
    sensing the output voltage of the power circuit; and
    in response to determining the duty cycle of the control signal is outside the defined range:
        determining a comparison voltage based on the sensed output voltage of the power circuit and the duty cycle of the control signal; and
        adjusting the reference voltage to equal the lessor of the comparison voltage and a maximum output voltage threshold of the power circuit.

11. The method of claim 10, wherein adjusting the reference voltage comprises adjusting the reference voltage over time to linearly adjust the output voltage of the power circuit.

12. The method of claim 10 further comprising adjusting the reference voltage based on a preset duty cycle threshold.

13. The method of claim 12 further comprising sensing an output current of the power circuit; and
    adjusting the reference voltage based on the sensed output current.

14. The method of claim 10 wherein the power circuit is a first power circuit coupled in parallel with a second power circuit; and
    wherein the method further comprises adjusting the reference voltage based on an output current sharing parameter of the first power circuit or the second power circuit.

15. The switched mode power supply of claim 14 wherein the output current sharing parameter includes a droop current sharing parameter.

16. A control circuit for regulating an output voltage of a switched mode power supply having at least one power switch, the control circuit configured to:
    generate a control signal for the at least one power switch using a reference voltage;
    determine if a duty cycle of the control signal is within a defined range;
    sense an output voltage of the switched mode power supply; and
    adjust the reference voltage if the duty cycle of the control signal is outside the defined range;
    wherein the reference voltage adjustment is based on:
        the output voltage;
        the duty cycle; and
        one or more of a defined maximum output voltage threshold of the power circuit, a defined minimum output voltage threshold of the power circuit, a defined maximum input voltage threshold of the power circuit, and a defined minimum input voltage threshold of the power circuit.

17. The control circuit of claim 16, wherein the control circuit is configured to adjust the reference voltage based on a preset duty cycle threshold.

18. The control circuit of claim 16, wherein the one or more of the defined maximum output voltage threshold, the defined minimum output voltage threshold, the defined maximum input voltage threshold, and the defined minimum input voltage threshold are stored in memory.

19. The control circuit of claim 16, wherein the control circuit is further configured to:
    sense an output current of the switched mode power supply; and
    adjust the reference voltage further based on the output current of the switched mode power supply.

20. The control circuit of claim 16, wherein the reference voltage is not adjusted based on a sensed input parameter of the switched mode power supply.

* * * * *